US012607823B2

(12) United States Patent
Yang et al.

(10) Patent No.: US 12,607,823 B2
(45) Date of Patent: Apr. 21, 2026

(54) WEARABLE ELECTRONIC DEVICE FOR ADJUSTING DISTANCE BETWEEN LENSES

(71) Applicant: SAMSUNG ELECTRONICS CO., LTD., Suwon-si (KR)

(72) Inventors: Hyunmo Yang, Suwon-si (KR); Gyeongbeom Kim, Suwon-si (KR); Jonggyu Park, Suwon-si (KR); Sungkwang Yang, Suwon-si (KR); Junwhon Uhm, Suwon-si (KR); Geonho Yoon, Suwon-si (KR); Gisoo Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 18/237,244

(22) Filed: Aug. 23, 2023

(65) Prior Publication Data

US 2024/0053578 A1 Feb. 15, 2024

Related U.S. Application Data

(63) Continuation of application No. PCT/KR2023/009605, filed on Jul. 6, 2023.

(30) Foreign Application Priority Data

Aug. 11, 2022 (KR) ........................ 10-2022-0100445
Sep. 7, 2022 (KR) ........................ 10-2022-0113283

(51) Int. Cl.
*G02B 7/12* (2021.01)
(52) U.S. Cl.
CPC ..................................... *G02B 7/12* (2013.01)
(58) Field of Classification Search
CPC ...................................................... G02B 7/12
(Continued)

(56) References Cited

U.S. PATENT DOCUMENTS 7,414,792 B2    8/2008  Domjan et al.
11,579,471 B2 *  2/2023  Ma .......................... G02C 11/10
                        (Continued)

FOREIGN PATENT DOCUMENTS

CN      105829953 A      8/2016
CN      107003527 A      8/2017
                (Continued)

OTHER PUBLICATIONS

Communication dated Oct. 11, 2023, issued by the International Searching Authority in counterpart International Application No. PCT/KR2023/009605 (PCT/ISA/210).
(Continued)

*Primary Examiner* — William Choi
(74) *Attorney, Agent, or Firm* — Sughrue Mion, PLLC

(57) ABSTRACT

A wearable electronic device includes an adjustment structure configured to adjust a distance between a first lens and a second lens. A user may wear the wearable electronic device and adjust an inter-lense distance so that there is a good match with the positions of their own eyes. The adjustment structure may include a lever, a first adjustment gear configured to be engaged with a first gear in a first position of the lever, a second adjustment gear configured to be engaged with the first gear and a second gear in a second position of the lever, and a third adjustment gear configured to be engaged with the second gear in a third position of the lever. The user may move the lever in or out to engage a different gear and then rotate the lever to adjust the inter-lense distance.

20 Claims, 22 Drawing Sheets

(58) Field of Classification Search
USPC ........................................................ 359/813
See application file for complete search history.

(56)                    References Cited

U.S. PATENT DOCUMENTS

| | | | |
|---|---|---|---|
| 2010/0067106 | A1 | 3/2010 | Woker et al. |
| 2020/0310137 | A1 | 10/2020 | Lan |
| 2021/0103150 | A1 | 4/2021 | Tempel |
| 2022/0082843 | A1 | 3/2022 | Magyari |

FOREIGN PATENT DOCUMENTS

| | | | |
|---|---|---|---|
| CN | 107577052 | A | 1/2018 |
| CN | 212905721 | U | 4/2021 |
| KR | 10-2013-0019505 | A | 2/2013 |
| KR | 20-0483039 | Y1 | 3/2017 |
| KR | 10-2018-0127886 | A | 11/2018 |
| KR | 10-2021-0117400 | A | 9/2021 |

OTHER PUBLICATIONS

Extended European Search Report dated Jul. 3, 2025, issued by the European Patent Office in European Application No. 23852753.5.

* cited by examiner

Location of adjustment structure 330. See FIGS. 2-22

WEARABLE ELECTRONIC DEVICE FOR ADJUSTING DISTANCE BETWEEN LENSES

CROSS-REFERENCE TO RELATED APPLICATIONS

This application is a continuation application of International Application No. PCT/KR2023/009605 designating the United States, filed on Jul. 6, 2023, in the Korean Intellectual Property Receiving Office and claiming priority to Korean Patent Application No. 10-2022-0100445, filed on Aug. 11, 2022, and Korean Patent Application No. 10-2022-0113283, filed on Sep. 7, 2022, in the Korean Intellectual Property Office, the disclosures of which are incorporated by reference herein in their entireties.

BACKGROUND

1. Field

The disclosure relates to a wearable electronic device, for example, a wearable electronic device for adjusting a distance between lenses.

2. Description of Related Art

Electronic devices with user interfaces for providing users with experiences of augmented reality, virtual reality, mixed reality, and/or extended reality are being developed. The above description is information the inventor(s) acquired during the course of conceiving the present disclosure, or already possessed at the time, and is not necessarily art publicly known before the present application was filed.

SUMMARY

According to an embodiment, a wearable electronic device includes a first base configured to move in a first direction or a second direction opposite to the first direction, a first lens disposed on the first base, a first gear connected to the first base, a second base configured to move in the first direction or the second direction, a second lens disposed on the second base, a second gear connected to the second base, a support body configured to support the first base and the second base, and an adjustment structure configured to adjust a distance between the first lens and the second lens. The adjustment structure may include a lever having a rotation axis in a third direction different from the first direction and the second direction, the lever being configured to move along the rotation axis and configured to rotate about the rotation axis, a first adjustment gear configured to be engaged with the first gear in a first position of the lever along the rotation axis, a second adjustment gear configured to be engaged with the first gear and the second gear in a second position of the lever along the rotation axis, and a third adjustment gear configured to be engaged with the second gear in a third position of the lever along the rotation axis.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
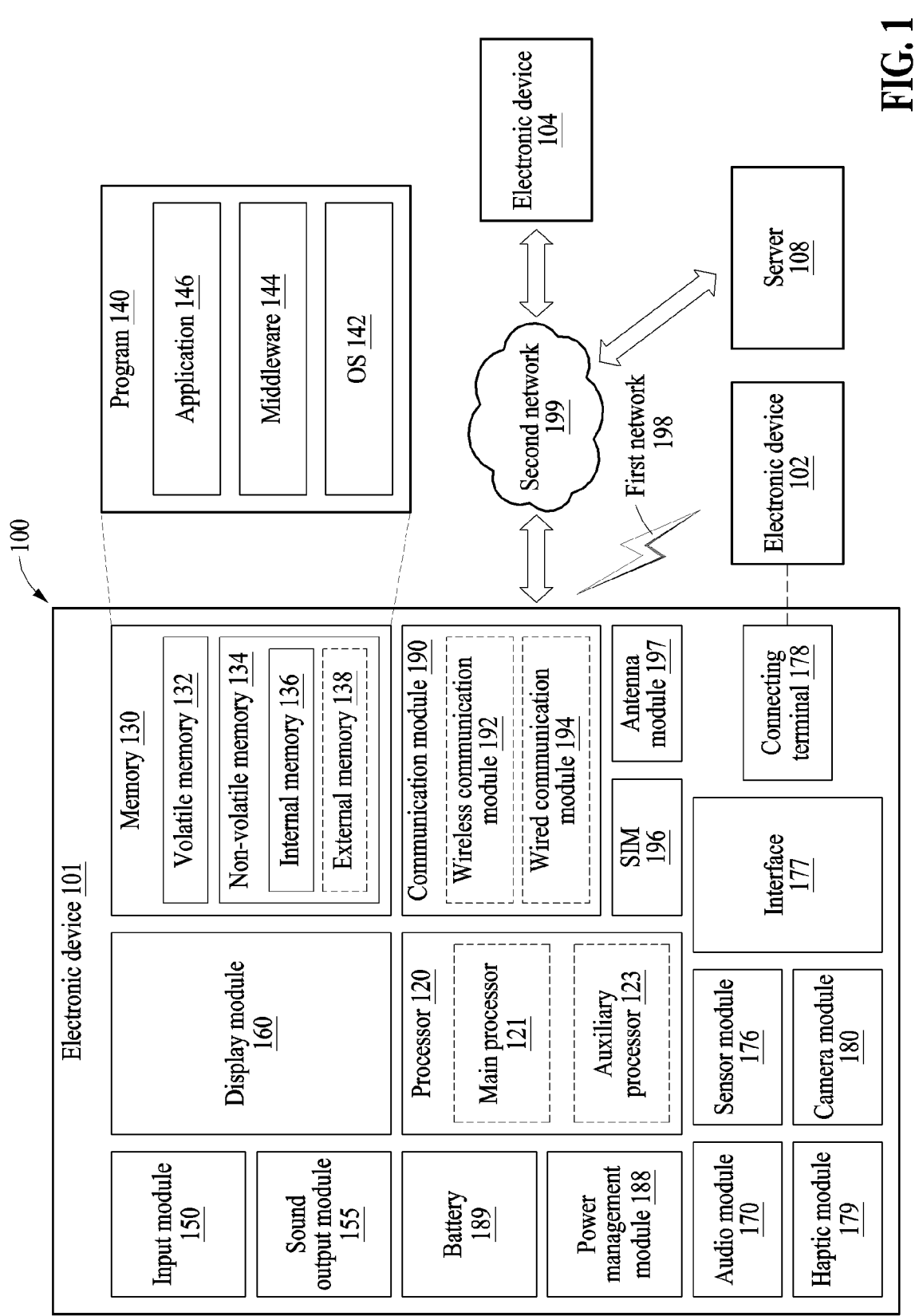
FIG. 1 is a block diagram of an electronic device in a network environment according to an embodiment.

FIG. 1 is a block diagram of an electronic device in a network environment according to an embodiment.

Referring to FIG. 1, an electronic device 101 in a network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal and vice versa. According to an embodiment, the audio module 170 may obtain the sound via the input module 150 or output the sound via the sound output module 155 or an external electronic device (e.g., an electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly.

According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "1st", "2nd", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic", "logic block", "part". or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments disclosed herein may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same manner or in a similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
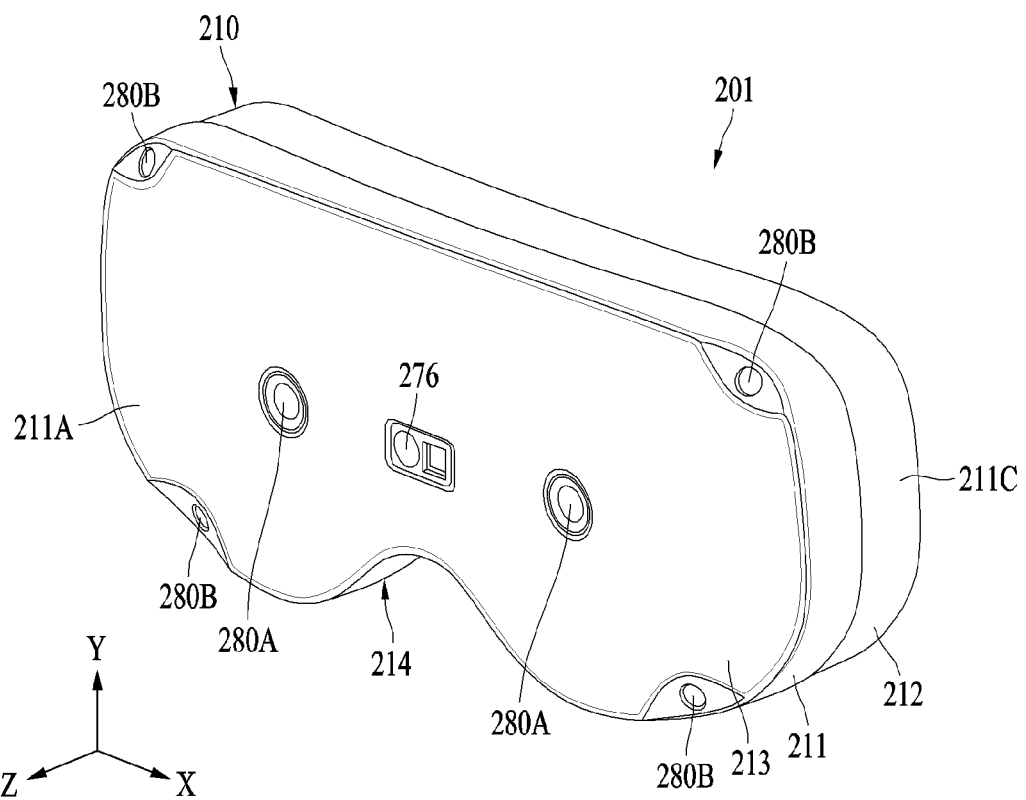
FIG. 2 is a front perspective view of a wearable electronic device according to an embodiment.
Figure 3:
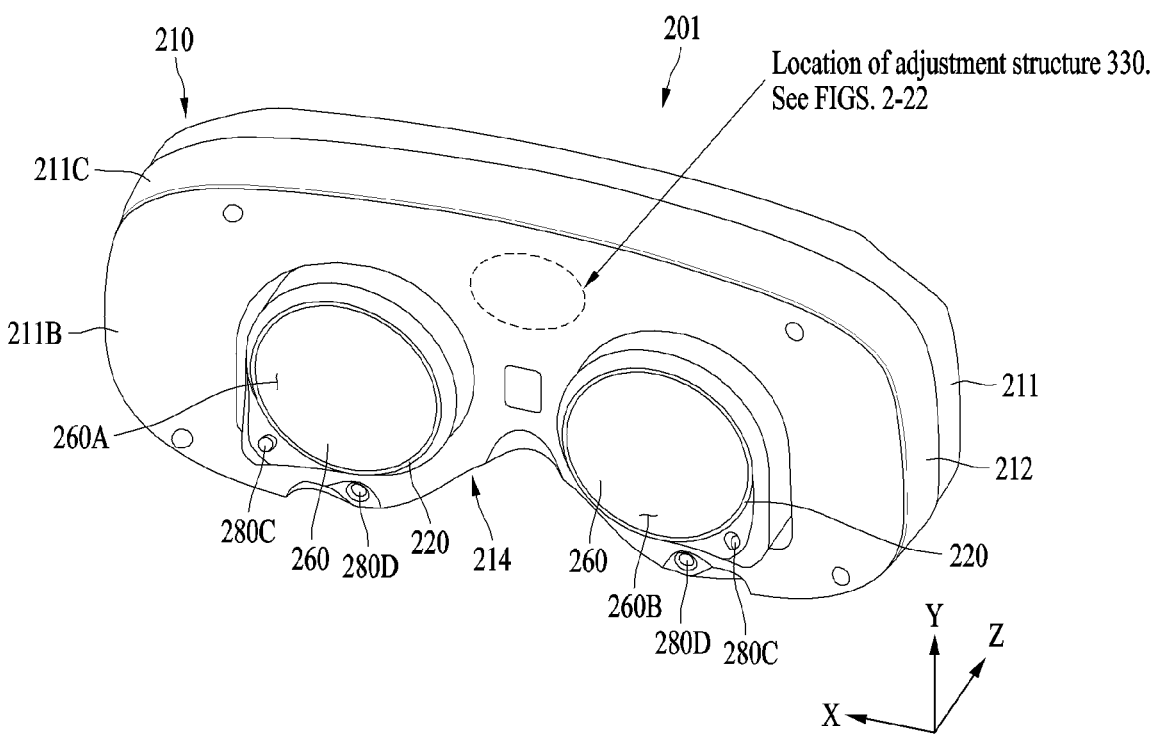
FIG. 3 is a rear perspective view of a wearable electronic device according to an embodiment.

FIG. 2 is a front perspective view of a wearable electronic device according to an embodiment. FIG. 3 is a rear perspective view of a wearable electronic device according to an embodiment.

Referring to FIGS. 2 and 3, a wearable electronic device 201 (e.g., the electronic device 101 of FIG. 1) may be worn by a part of a body of a user and may provide a user interface. For example, the wearable electronic device 201 may provide an experience of augmented reality, virtual reality, mixed reality, and/or extended reality to the user.

In an embodiment, the wearable electronic device 201 may include a housing 210. The housing 210 may be configured to accommodate at least one component. The housing 210 may include a first surface 211A (e.g., a front surface), a second surface 211B (e.g., a rear surface) opposite to the first surface 211A, and a third surface 211C (e.g., a side surface) between the first surface 211A and the second surface 211B. The position of an adjustment structure 330 with respect to the rear surface is indicated with a dashed ellipse. The adjustment structure 330 is described in detail below beginning with the discussion of FIG. 3.

In an embodiment, the housing 210 may include a plurality of housing parts. For example, the housing 210 may include a first housing part 211 and a second housing part 212. The first housing part 211 may form the first surface 211A of the housing 210. The first housing part 211 may form at least a portion of the third surface 211C of the housing 210. The second housing part 212 may form the second surface 211B of the housing 210. The second housing part 212 may form at least a portion of the third surface 211C of the housing 210. In an embodiment, the second housing part 212 may face a part (e.g., a face) of the body of the user. In an embodiment, the first housing part 211 may be detachably coupled to the second housing part 212. In an embodiment, the first housing part 211 and the second housing part 212 may be seamlessly connected as one.

In an embodiment, the housing 210 may include a cover 213. The cover 213 may form the first surface 211A of the housing 210. The cover 213 may be configured to cover at least a portion of the first housing part 211.

In an embodiment, the housing 210 may include a bridge 214. The bridge 214 may be configured to face a part (e.g., a nose) of the body of the user. For example, the bridge 214 may be supported by the nose of the user. The bridge 214 may be formed in at least one of the first housing part 211, the second housing part 212, or the cover 213, or any combination thereof.

In an embodiment, the wearable electronic device 201 may include a lens structure 220. The lens structure 220 may include a plurality of lenses configured to adjust a focus of an image provided to a user. For example, the plurality of lenses may be configured to adjust a focus of an image output by a display 260. The plurality of lenses may be disposed in a position corresponding to a position of the display 260. The plurality of lenses may include, for example, a Fresnel lens, a pancake lens, a multichannel lens, and/or other appropriate lenses.

In an embodiment, the wearable electronic device 201 may include a display 260 (e.g., the display module 160 of FIG. 1). The display 260 may be configured to provide an image (e.g., a virtual image) to a user. For example, the display 260 may include a liquid crystal display (LCD), a digital mirror device (DMD), a liquid crystal on silicon (LCoS), an organic light-emitting diode (OLED), and/or a micro light-emitting diode (micro LED). In an embodiment, the display 260 may include a light source (not illustrated) configured to transmit an optical signal to an area on which an image is displayed. In an embodiment, the display 260 may provide an image to a user by generating an optical signal by itself. In an embodiment, the display 260 may be disposed on the second surface 211B of the housing 210. In an embodiment, the display 260 may be disposed in the second housing part 212. In an embodiment, the display 260 may include a first display area 260A and a second display area 260B. The first display area 260A may be disposed to face a left eye of a user. The second display area 260B may be disposed to face a right eye of the user. In an embodiment, the first display area 260A and the second display area 260B may include glass, plastic, and/or polymer. In an embodiment, the first display area 260A and the second display area 260B may include a transparent material or a translucent material. In an embodiment, the first display area 260A and the second display area 260B may form a single display area. In an embodiment, the first display area 260A and the second display area 260B may form a plurality of display areas.

In an embodiment, the wearable electronic device 201 may include a sensor 276 (e.g., the sensor module 176 of FIG. 1). The sensor 276 may be configured to sense a depth of a subject. The sensor 276 may be configured to transmit a signal to the subject and/or receive a signal from the subject. For example, a transmission signal may include a near infrared ray, an ultrasonic wave, and/or a laser. The sensor 276 may be configured to measure a time of flight (ToF) of a signal to measure a distance between the wearable electronic device 201 and the subject. In an embodiment, the sensor 276 may be disposed on the first surface 211A of the housing 210. In an embodiment, the sensor 276 may be disposed on a central portion of the cover 213 and/or the first housing part 211.

In an embodiment, the wearable electronic device 201 may include a plurality of first cameras 280A (e.g., the camera module 180 of FIG. 1). The plurality of first cameras 280A may be configured to obtain an image from a subject. One of the plurality of first cameras 280A may be disposed on a first area (e.g., a portion in the −X direction in FIG. 2) of the first surface 211A of the housing 210 and another one of the plurality of first cameras 280A may be disposed on a second area (e.g., a portion in the +X direction in FIG. 2) of the housing 210 on the first surface 211A of the housing 210. The second area may be different from the first area. The plurality of first cameras 280A may be disposed on both sides of the sensor 276. The plurality of first cameras 280A may include an image stabilizer actuator (not illustrated) and/or an autofocus actuator (not illustrated). The plurality of first cameras 280A may include, for example, at least one of a camera configured to obtain a color image, a global shutter camera, or a rolling shutter camera, or any combination thereof.

In an embodiment, the wearable electronic device 201 may include a plurality of second cameras 280B (e.g., the camera module 180 of FIG. 1). The plurality of second cameras 280B may be configured to recognize a subject. The plurality of second cameras 280B may be configured to detect and/or track a space or an object (e.g., a head or hand of a human body) with three degrees of freedom (3DoF) or six degrees of freedom (6DoF). For example, the plurality of second cameras 280B may include a global shutter camera. The plurality of second cameras 280B may be configured to perform simultaneous localization and mapping (SLAM) using depth information of a subject. The plurality of second cameras 280B may be configured to recognize a gesture of a subject. In an embodiment, the plurality of second cameras 280B may be disposed on the first surface 211A of the housing 210. In an embodiment, the plurality of second cameras 280B may be disposed on corner areas of the cover 213 and/or the first housing part 211, respectively.

In an embodiment, the wearable electronic device 201 may include a plurality of third cameras 280C (e.g., third camera module 180 of FIG. 1). The plurality of third cameras 280C may be configured to detect and track pupils of a user. Position information associated with the pupils of the user may be used such that a center of an image displayed on the display 260 may move in a direction in which the pupils of the user gaze. For example, the plurality of third cameras 280C may include a global shutter camera. One of the plurality of third cameras 280C may be disposed to correspond to a left eye of a user and another one of the plurality of third cameras 280C may be disposed to correspond to a right eye of the user.

In an embodiment, the wearable electronic device 201 may include a plurality of fourth cameras 280D (e.g., the camera module 180 of FIG. 1). The plurality of fourth cameras 280D may be configured to recognize a face of a user. For example, the plurality of fourth cameras 280D may be configured to detect and track a facial expression of the user.

In an embodiment that is not illustrated, the wearable electronic device 201 may include a microphone (e.g., the input module 150 of FIG. 1), a speaker (e.g., the sound output module 155 of FIG. 1), a battery (e.g., the battery 189 of FIG. 1), an antenna (e.g., the antenna module 197 of FIG. 1), a sensor (e.g., the sensor module 176 of FIG. 1), and/or other components suitable for the wearable electronic device 201.

Figure 4:
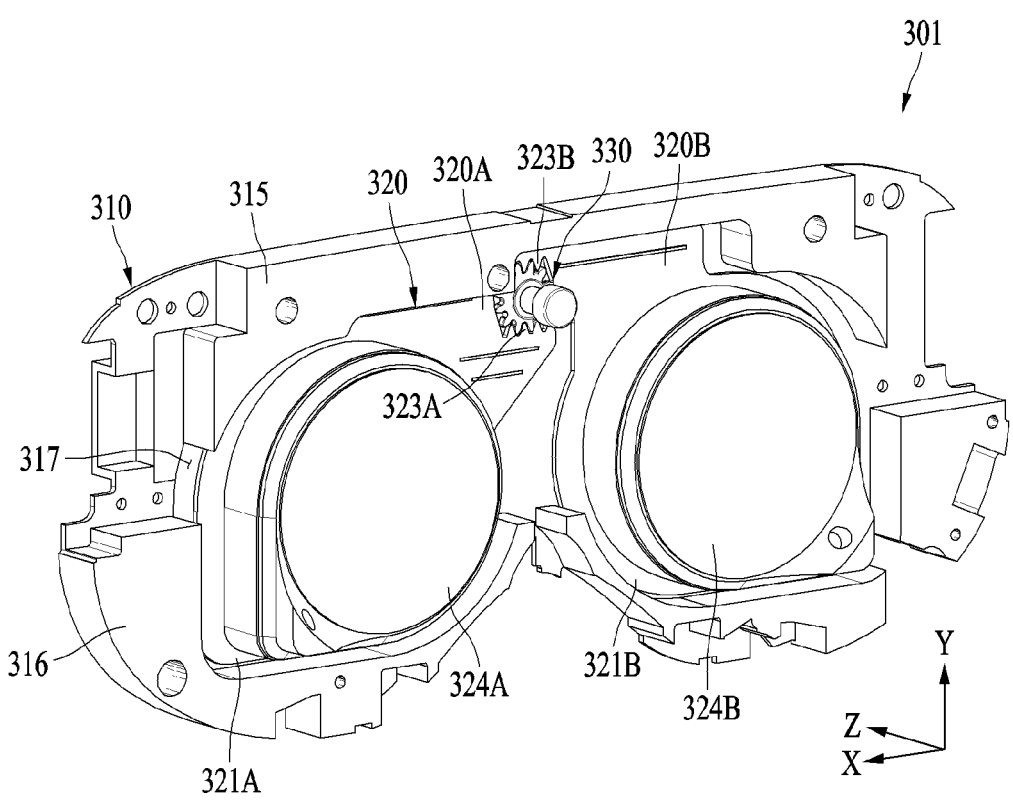
FIG. 4 is a perspective view of a wearable electronic device according to an embodiment.
Figure 5:
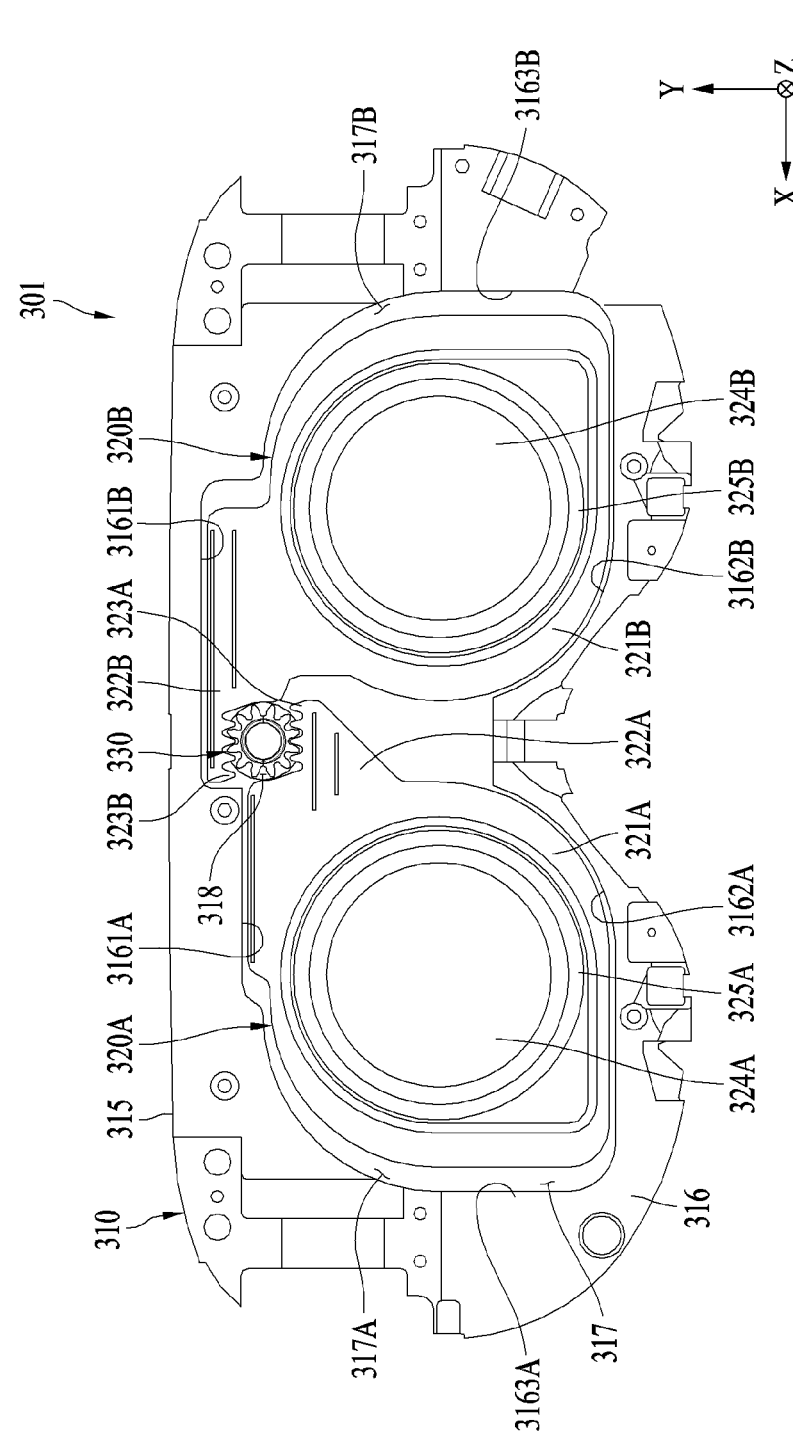
FIG. 5 is a plan view of a wearable electronic device according to an embodiment.

FIG. 4 is a perspective view of a wearable electronic device according to an embodiment. FIG. 5 is a plan view of a wearable electronic device according to an embodiment.

Referring to FIGS. 4 and 5, a wearable electronic device 301 (e.g., the electronic device 101 of FIG. 1 and/or the wearable electronic device 201 of FIGS. 2 and 3) may include a housing 310 (e.g., the housing 210 of FIGS. 2 and 3). The housing 310 may include a support body 315. The support body 315 may be configured to support a lens structure 320 (e.g., the lens structure 220 of FIGS. 2 and 3). The lens structure 320 may include a first lens structure 320A corresponding to a left eye of a user, and a second lens structure 320B corresponding to a right eye of the user.

In an embodiment, the support body 315 may include a body portion 316. The body portion 316 may be configured to enclose at least a portion of the lens structure 320.

In an embodiment, the body portion 316 may include a first edge 3161A extending along a first side (e.g., an upper side or a side facing the +Y direction) of the first lens structure 320A. The body portion 316 may include a second edge 3162A extending along a second side (e.g., a lower side or a side facing the −Y direction) opposite to the first side of the first lens structure 320A. The body portion 316 may include a first side edge 3163A extending along the outer side (e.g., a side facing the +X direction) of the first lens structure 320A. The first side edge 3163A may connect the first edge 3161A and the second edge 3162A. At least a portion of the first edge 3161A, at least a portion of the second edge 3162A, and/or at least a portion of the first side edge 3163A may be curved along a shape of a side of the first lens structure 320A.

In an embodiment, the body portion 316 may include a third edge 3161B extending along a third side (e.g., an upper side or a side facing the +Y direction) of the second lens structure 320B. The body portion 316 may include a fourth edge 3162B extending along a fourth side (e.g., a lower side or a side facing the −Y direction) opposite to the third side of the second lens structure 320B. The body portion 316 may include a second side edge 3163B extending along the outer side (e.g., a side facing the −X direction) of the second lens structure 320B. The second side edge 3163B may connect the third edge 3161B and the fourth edge 3162B. At least a portion of the third edge 3161B, at least a portion of the fourth edge 3162B, and/or at least a portion of the second side edge 3163B may be curved along a shape of a side of the second lens structure 320B.

In an embodiment, the support body 315 may include a recess 317 formed on one surface of the body portion 316. The recess 317 may be configured to receive at least a portion of the lens structure 320.

In an embodiment, the recess 317 may include a first recess region 317A that receives at least a portion of the first lens structure 320A. At least a portion of the first recess region 317A may be defined by the first edge 3161A, the second edge 3162A, and the first side edge 3163A.

In an embodiment, the recess 317 may include a second recess region 317B that receives at least a portion of the second lens structure 320B. At least a portion of the second recess region 317B may be defined by the third edge 3161B, the fourth edge 3162B, and the second side edge 3163B.

In an embodiment, the support body 315 may include an opening 318. The opening 318 may be disposed in the recess 317. The opening 318 may be configured to pass through the support body 315. The opening 318 may be disposed in a central portion of the recess 317.

In an embodiment, the first lens structure 320A may include a first base 321A. The first base 321A may be disposed in the first recess region 317A. The first base 321A may be configured to move in a first direction (e.g., the +X direction) or a second direction (e.g., the −X direction) opposite to the first direction in the first recess region 317A. In an embodiment, the movement of the first base 321A may be guided by the first edge 3161A, the second edge 3162A, and the first side edge 3163A. In an embodiment, the first base 321A may form a gap with the first edge 3161A, the second edge 3162A, and/or the first side edge 3163A. In an embodiment, the first base 321A may not form a gap with at least one of the first edge 3161A, the second edge 3162A, or the first side edge 3163A, or any combination thereof.

In an embodiment, the first lens structure 320A may include a first arm 322A. The first arm 322A may extend or expand toward the inside (e.g., in the −X direction) of the first base 321A. In an embodiment, the first base 321A and the first arm 322A may be seamlessly connected as one.

In an embodiment, the first lens structure 320A may include a first gear 323A. The first gear 323A may include a plurality of first teeth arranged in the first direction (e.g., the +X direction) or the second direction (e.g., the −X direction). The plurality of first teeth may be disposed at one edge (e.g., an edge facing the +Y direction) of the first arm 322A.

In an embodiment, the first lens structure 320A may include a first lens 324A. The first lens 324A may be disposed on the first base 321A.

In an embodiment, the first lens structure 320A may include a first lens barrel 325A. The first barrel 325A may receive at least a portion of the first lens 324A. The first barrel 325A may enclose at least a portion of the first lens 324A. The first barrel 325A may be disposed on the first base 321A.

In an embodiment, the second lens structure 320B may include a second base 321B. The second base 321B may be disposed in the second recess region 317B. The second base 321B may be configured to move in the first direction (e.g., the +X direction) or in the second direction (e.g., the −X direction) opposite to the first direction in the second recess region 317B. In an embodiment, the movement of the second base 321B may be guided by the third edge 3161B, the fourth edge 3162B, and the second side edge 3163B. In an embodiment, the second base 321B may form a gap with the third edge 3161B, the fourth edge 3162B, and/or the second side edge 3163B. In an embodiment, the second base 321B may not form a gap with at least one of the third edge 3161B, the fourth edge 3162B, or the second side edge 3163B, or any combination thereof.

In an embodiment, the movement of the first base 321A may be independent of the movement of the second base 321B. For example, when the first base 321A moves, the second base 321B may not move. In an embodiment, the movement of the first base 321A may be interlocked with the movement of the second base 321B. For example, when the first base 321A moves in the first direction (e.g., the +X direction), the second base 321B may move in the second direction (e.g., the –X direction).

In an embodiment, the first base 321A and the second base 321B may be disposed on substantially the same plane. The first recess region 317A in which the first base 321A is disposed may be in substantially the same plane as the second recess region 317B in which the second base 321B is disposed.

In an embodiment, the first base 321A and the second base 321B may be disposed separately from each other in the recess 317.

In an embodiment, the second lens structure 320B may include a second arm 322B. The second arm 322B may extend or expand toward the inside (e.g., in the +X direction) of the second base 321B. In an embodiment, the second base 321B and the second arm 322B may be seamlessly connected as one.

In an embodiment, the second lens structure 320B may include a second gear 323B. The second gear 323B may include a plurality of second teeth arranged in the first direction (e.g., the +X direction) or the second direction (e.g., the –X direction). The plurality of second teeth may be disposed at one edge (e.g., an edge facing the –Y direction) of the second arm 322B. The plurality of second teeth may face the plurality of first teeth.

In an embodiment, the second lens structure 320B may include a second lens 324B. The second lens 324B may be disposed on the second base 321B.

In an embodiment, the second lens structure 320B may include a second barrel 325B. The second barrel 325B may receive at least a portion of the second lens 324B. The second barrel 325B may enclose at least a portion of the second lens 324B. The second barrel 325B may be disposed on the second base 321B.

In an embodiment, the wearable electronic device 301 may include an adjustment structure 330. When the wearable electronic device 301 is worn by the user, the adjustment structure 330 is above the nose of the user and on the side of the wearable electronic device 301 toward the face of the user. The adjustment structure 330 may be configured to adjust a distance between the first lens 324A and the second lens 324B. The distance may be referred to as an inter-lens distance. The adjustment structure 330 may be configured to adjust a position of the first lens 324A and/or a position of the second lens 324B to match an individual interpupillary distance (IPD) of a user. In an embodiment, the adjustment structure 330 may be at least partially received in the opening 318.

Figure 6:
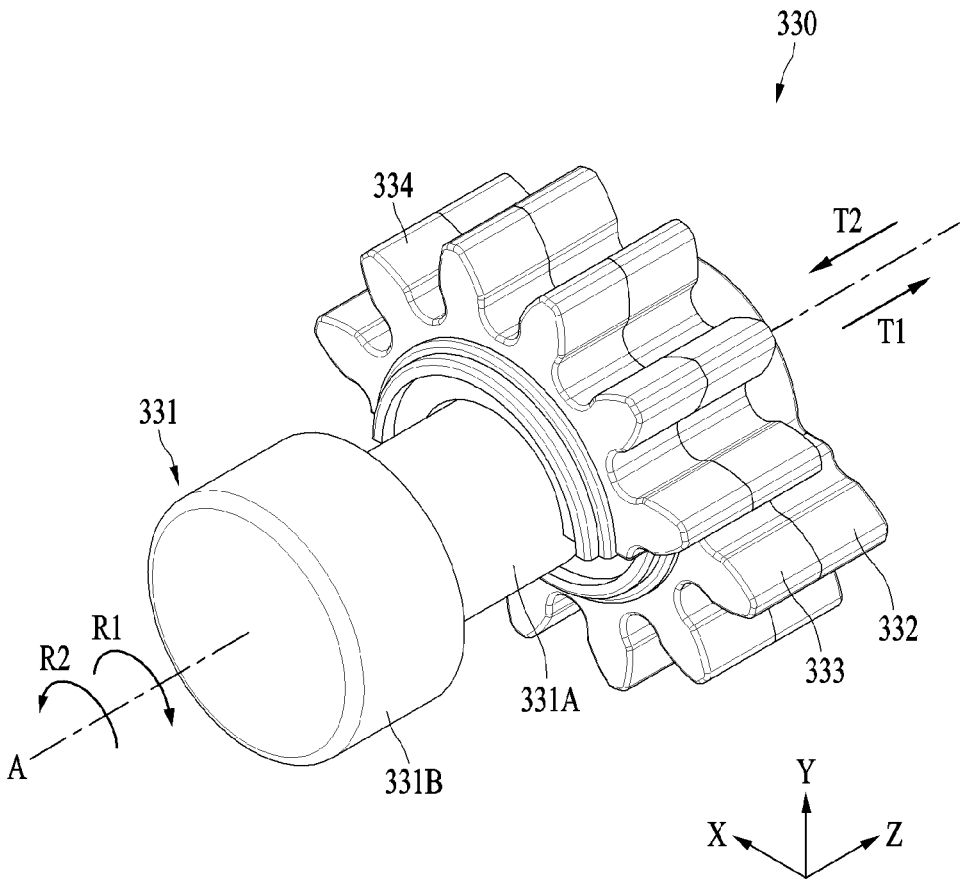
FIG. 6 is a perspective view of an adjustment structure according to an embodiment.
Figure 7:
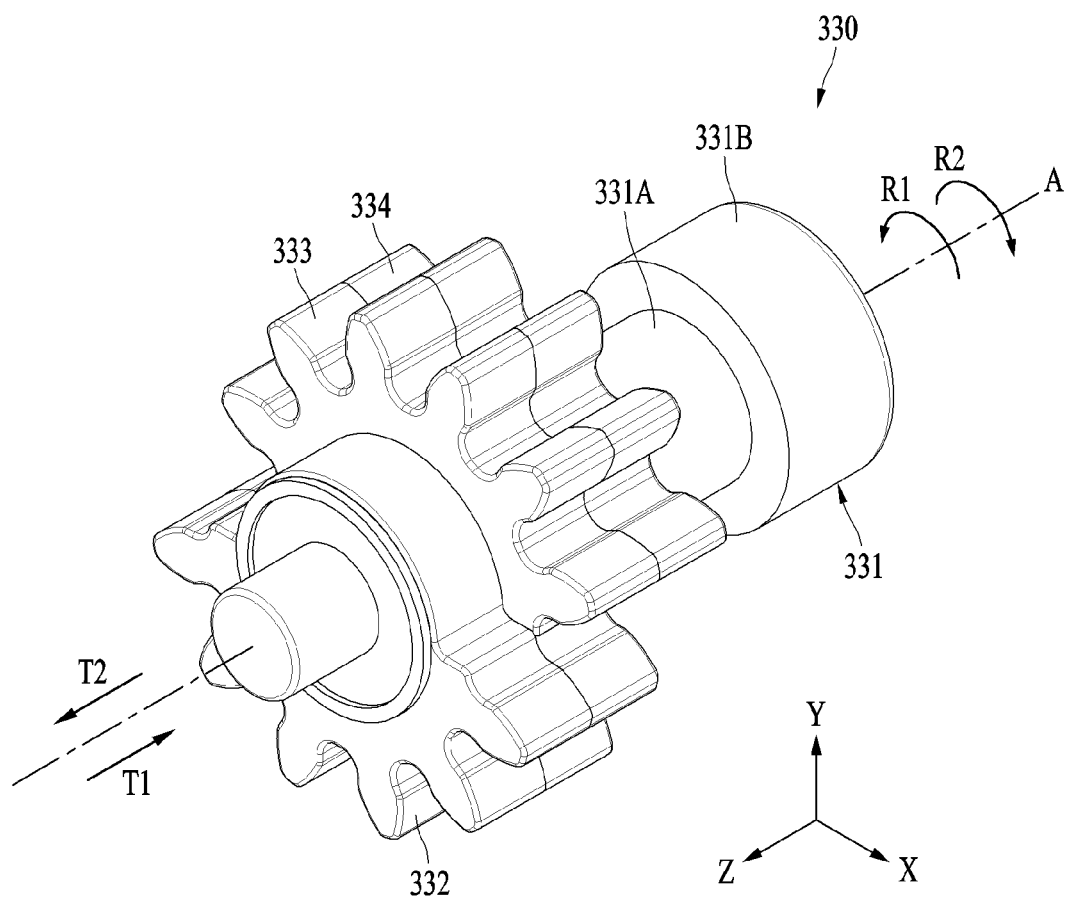
FIG. 7 is a perspective view of an adjustment structure according to an embodiment.
Figure 8:
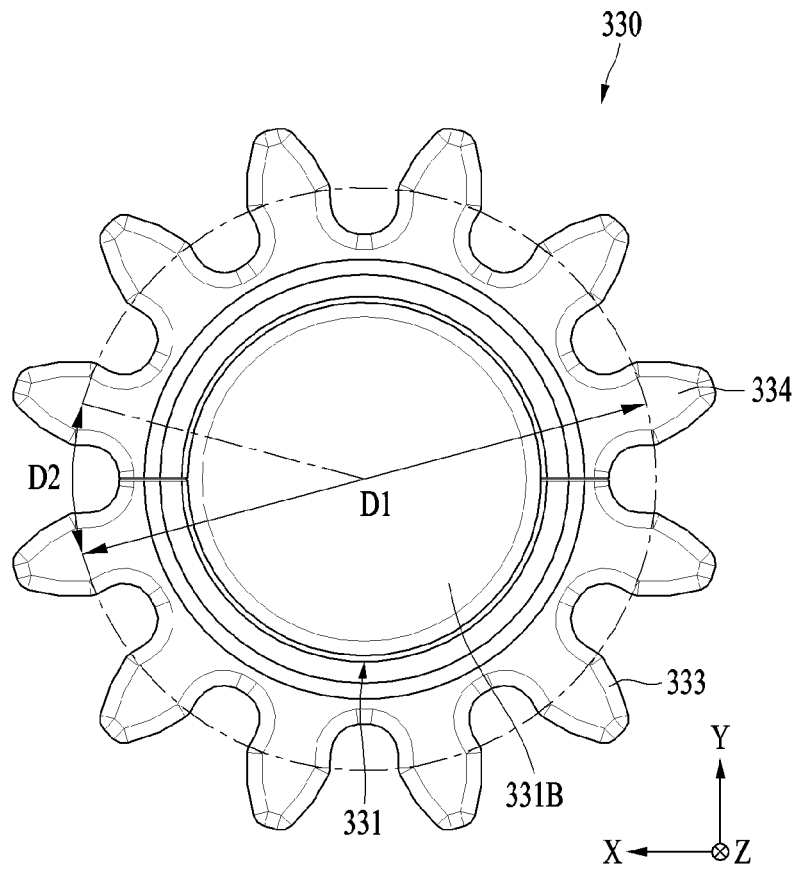
FIG. 8 is a plan view of an adjustment structure according to an embodiment.
Figure 9:
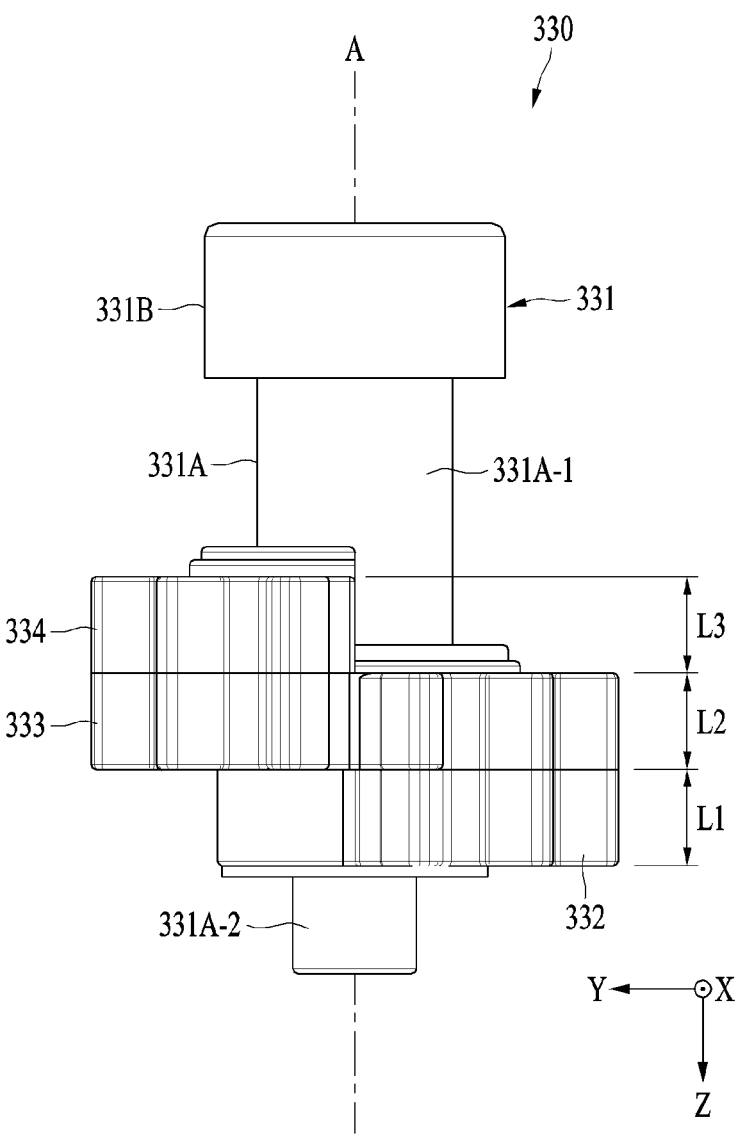
FIG. 9 is a side view of an adjustment structure according to an embodiment.

FIG. 6 is a perspective view of an adjustment structure according to an embodiment. FIG. 7 is a perspective view of an adjustment structure according to an embodiment. FIG. 8 is a plan view of an adjustment structure according to an embodiment. FIG. 9 is a side view of an adjustment structure according to an embodiment.

Referring to FIGS. 4 to 9, the adjustment structure 330 may include a lever 331. The lever 331 may have a rotation axis A in a third direction (e.g., the +/–Z direction) crossing (e.g., substantially perpendicular to) each of the first direction (e.g., the +X direction) and the second direction (e.g., the –X direction). In some embodiments, the lever 331 is a rounded handle or knob. The lever 331 may be configured to rotate in a first rotation direction R1 (e.g., a counterclockwise direction around a +Z axis) about the rotation axis A. The lever 331 may be configured to rotate in a second rotation direction R2 (e.g., a clockwise direction around the +Z axis), opposite to the first rotation direction R1, about the rotation axis A. The lever 331 may be configured to move in a first movement direction T1 (e.g., the +Z direction) along the rotation axis A. The lever 331 may be configured to move in a second movement direction T2 (e.g., the –Z direction) opposite to the first movement direction T1 along the rotation axis A.

In an embodiment, the lever 331 may be disposed between the first base 321A and the second base 321B. In an embodiment, the lever 331 may be at least partially received in the opening 318.

In an embodiment, the lever 331 may include a shaft 331A. The shaft 331A may have the rotation axis A. The shaft 331A may extend in the third direction (e.g., the +/–Z direction). The shaft 331A may include a substantially cylindrical shape.

In an embodiment, the shaft 331A may include a first shaft portion 331A-1 and a second shaft portion 331A-2. The first shaft portion 331A-1 may be connected to a second adjustment gear 333 and a third adjustment gear 334. The second shaft portion 331A-2 may be connected to a first adjustment gear 332. The second shaft portion 331A-2 may be connected to the second adjustment gear 333. The diameter or width of the first shaft portion 331A-1 may be greater than the diameter or width of the second shaft portion 331A-2.

In an embodiment, the lever 331 may include a handle 331B. The handle 331B may be connected to one end portion (e.g., an end portion facing the –Z direction) of the first shaft portion 331A-1. The handle 331B may include a substantially cylindrical shape or a disk shape. The diameter or width of the handle 331B may be greater than the diameter or width of the first shaft portion 331A.

In an embodiment, the adjustment structure 330 may include the first adjustment gear 332. The first adjustment gear 332 may be configured to be engaged with the first gear 323A. For example, the first adjustment gear 332 may be configured to be engaged with the first gear 323A in a predetermined position (e.g., a first position of the lever 331 in FIGS. 10 to 12) of the lever 331 along the rotation axis A. In an embodiment, the first adjustment gear 332 may be configured not to be engaged with the second gear 323B.

In an embodiment, the first adjustment gear 332 may be configured to rotate in the first rotation direction R1 or the second rotation direction R2 about the rotation axis A. The user may perform the adjustment by rotating the lever 331 with their hand in order to adjust the distance between the lenses to suit the distance between the eyes of the user.

In an embodiment, the first adjustment gear 332 may be at least partially received in the opening 318.

In an embodiment, the first adjustment gear 332 may include a plurality of first adjustment teeth arranged in a circumferential direction of the shaft 331A around the rotation axis A. The plurality of first adjustment teeth may be arranged in a portion (e.g., about 180 degrees) of the shaft 331A in the circumferential direction of the shaft 331A.

In an embodiment, the first adjustment gear 332 may be integrally and seamlessly connected to the shaft 331A. In an embodiment, the first adjustment gear 332 and the shaft 331A may be coupled to each other as separate components.

In an embodiment, the adjustment structure 330 may include the second adjustment gear 333. The second adjustment gear 333 may be configured to be engaged with the first gear 323A and the second gear 323B. For example, the second adjustment gear 333 may be configured to be engaged with both the first gear 323A and the second gear 323B in a predetermined position (e.g., a second position of the lever 331 in FIGS. 13 to 15) of the lever 331 along the rotation axis A.

In an embodiment, the second adjustment gear 333 may be configured to rotate in the first rotation direction R1 or the second rotation direction R2 about the rotation axis A.

In an embodiment, the second adjustment gear 333 may be at least partially received in the opening 318.

In an embodiment, the second adjustment gear 333 may include a plurality of second adjustment teeth arranged in the circumferential direction of the shaft 331A around the rotation axis A. The plurality of second adjustment teeth may be arranged in all portions (e.g., about 360 degrees) of the shaft 331A in the circumferential direction of the shaft 331A.

In an embodiment, the second adjustment gear 333 may be integrally and seamlessly connected to the shaft 331A. In an embodiment, the second adjustment gear 333 and the shaft 331A may be coupled to each other as separate components.

In an embodiment, the second adjustment gear 333 may be disposed closer to the handle 331B than the first adjustment gear 332.

In an embodiment, the second adjustment gear 333 may at least partially overlap the first adjustment gear 332 when viewed in the direction (e.g., the +/−Z direction) along the rotation axis A.

In an embodiment, a pitch diameter D1 of the second adjustment gear 333 may be substantially equal to a pitch diameter D1 of the first adjustment gear 332. In an embodiment, a circular pitch D2 of the second adjustment gear 333 may be substantially equal to a circular pitch D2 of the first adjustment gear 332.

In an embodiment, a second thickness L2 of the second adjustment gear 333 may be substantially equal to a first thickness L1 of the first adjustment gear 332. In an embodiment, the second thickness L2 of the second adjustment gear 333 may be different from the first thickness L1 of the first adjustment gear 332.

In an embodiment, the second adjustment gear 333 may be integrally and seamlessly connected to the first adjustment gear 332. In an embodiment, the first adjustment gear 332 and the second adjustment gear 333 may be coupled to each other as separate components. In an embodiment, the first adjustment gear 332 and the second adjustment gear 333 may be separated from each other when viewed in the direction (e.g., the +/−Z direction) along the rotation axis A.

In an embodiment, the adjustment structure 330 may include the third adjustment gear 334. The third adjustment gear 334 may be configured to be engaged with the second gear 323B. For example, the third adjustment gear 334 may be configured to be engaged with the second gear 323B in a predetermined position (e.g., a third position of the lever 331 in FIGS. 16 to 18) of the lever 331 along the rotation axis A. In an embodiment, the third adjustment gear 334 may be configured not to be engaged with the first gear 323A.

In an embodiment, the third adjustment gear 334 may be configured to rotate in the first rotation direction R1 or the second rotation direction R2 about the rotation axis A.

In an embodiment, the third adjustment gear 334 may be at least partially received in the opening 318.

In an embodiment, the third adjustment gear 334 may include a plurality of third adjustment teeth arranged in the circumferential direction of the shaft 331A around the rotation axis A. The plurality of third adjustment teeth may be arranged in a portion (e.g., about 180 degrees) of the shaft 331A in the circumferential direction of the shaft 331A.

In an embodiment, the third adjustment gear 334 may be integrally and seamlessly connected to the shaft 331A. In an embodiment, the third adjustment gear 334 and the shaft 331A may be coupled to each other as separate components.

In an embodiment, the third adjustment gear 334 may be disposed closer to the handle 331B than the second adjustment gear 333.

In an embodiment, the third adjustment gear 334 may at least partially overlap the second adjustment gear 333 when viewed in the direction (e.g., the +/−Z direction) along the rotation axis A. In an embodiment, the third adjustment gear 334 may not substantially overlap the first adjustment gear 332 when viewed in the direction (e.g., the +/−Z direction) along the rotation axis A.

In an embodiment, a pitch diameter D1 of the third adjustment gear 334 may be substantially equal to the pitch diameter D1 of the first adjustment gear 332 and/or the pitch diameter D1 of the second adjustment gear 333. In an embodiment, a circular pitch D2 of the third adjustment gear 334 may be substantially equal to the circular pitch D2 of the first adjustment gear 332 and/or the circular pitch D2 of the second adjustment gear 333.

In an embodiment, a third thickness L3 of the third adjustment gear 334 may be substantially equal to the first thickness L1 of the first adjustment gear 332 and/or the second thickness L2 of the second adjustment gear 333. In an embodiment, the third thickness L3 of the third adjustment gear 334 may be different from the first thickness L1 of the first adjustment gear 332 and/or the second thickness L2 of the second adjustment gear 333.

In an embodiment, the third adjustment gear 334 may be integrally and seamlessly connected to the second adjustment gear 333. In an embodiment, the second adjustment gear 333 and the third adjustment gear 334 may be coupled to each other as separate components. In an embodiment, the second adjustment gear 333 and the third adjustment gear 334 may be separated from each other when viewed in the direction (e.g., the +/−Z direction) along the rotation axis A.

Figure 10:
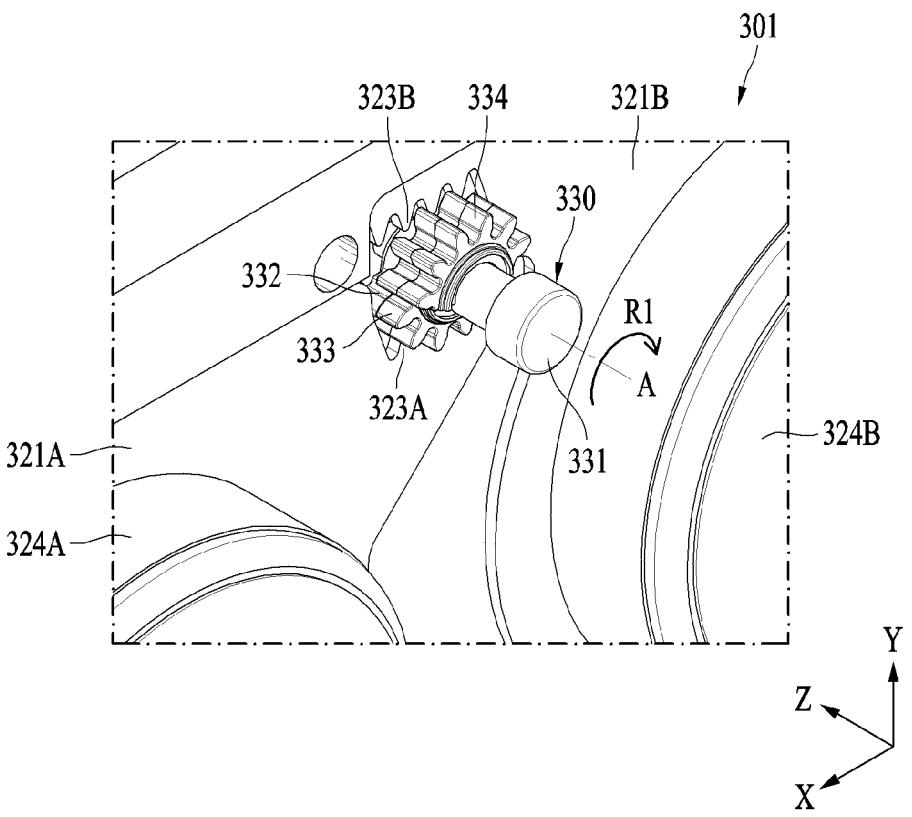
FIG. 10 is an enlarged view of a wearable electronic device when a lever is in a first position according to an embodiment.
Figure 11:
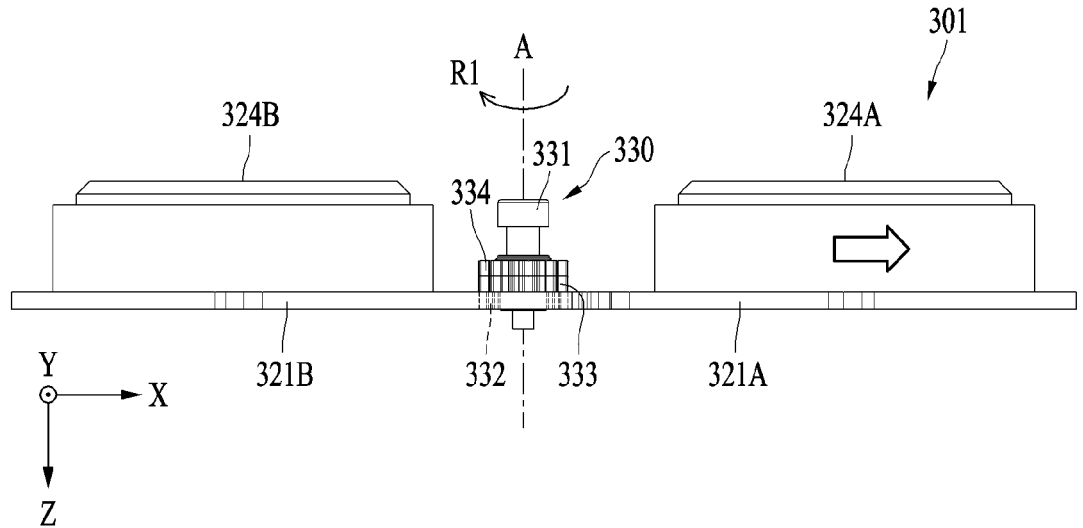
FIG. 11 is a bottom view of the wearable electronic device when the lever is in the first position according to an embodiment.
Figure 12:
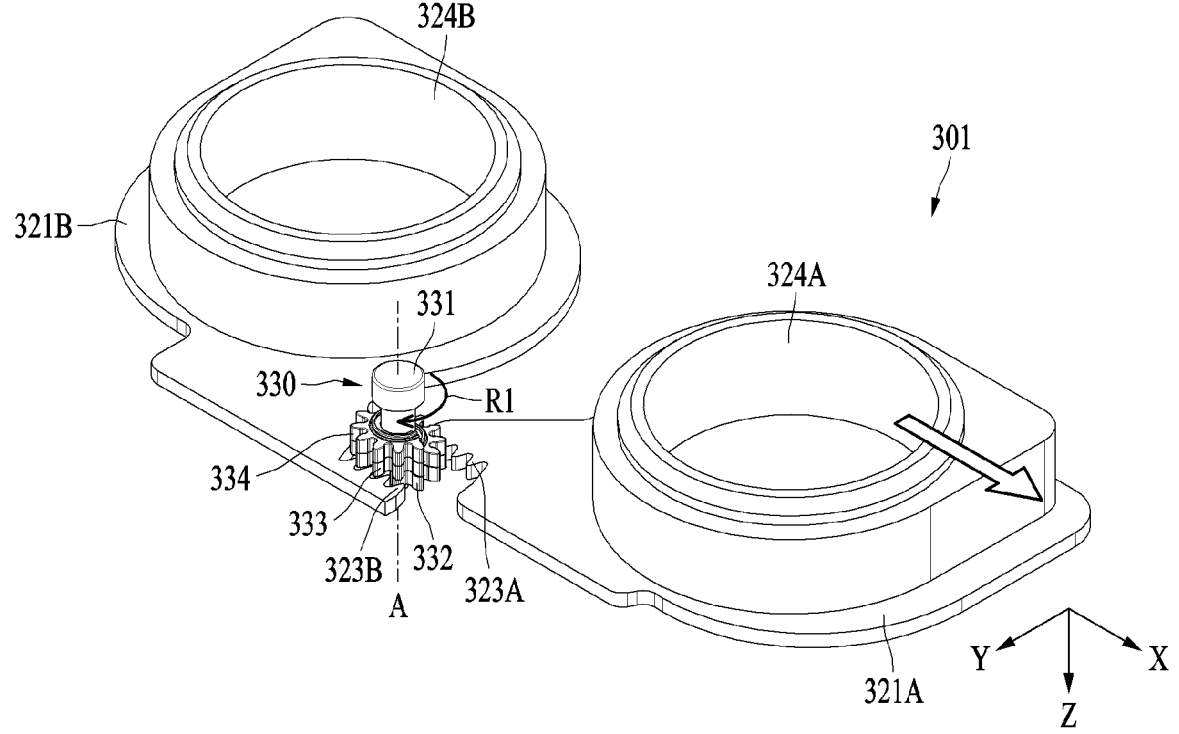
FIG. 12 is a perspective view of the wearable electronic device when the lever is in the first position according to an embodiment.

FIG. 10 is an enlarged view of a wearable electronic device when a lever is in a first position according to an embodiment. FIG. 11 is a bottom view of the wearable electronic device when the lever is in the first position according to an embodiment. FIG. 12 is a perspective view of the wearable electronic device when the lever is in the first position according to an embodiment.

Referring to FIGS. 10 to 12, the wearable electronic device 301 may include the first base 321A, the second base 321B, the first gear 323A, the second gear 323B, the first lens 324A, the second lens 324B, and the adjustment structure 330. The adjustment structure 330 may include the lever 331 having the rotation axis A, the first adjustment gear 332, the second adjustment gear 333, and the third adjustment gear 334.

When the lever 331 is in the first position along the rotation axis A, the first adjustment gear 332 may be engaged with the first gear 323A. The second adjustment gear 333 and the third adjustment gear 334 may not be engaged with any one of the first gear 323A and the second gear 323B.

When the lever 331 rotates in the first rotation direction R1 (e.g., a counterclockwise direction around the +Z axis) about the rotation axis A, the first adjustment gear 332 may rotate in the first rotation direction R1 about the rotation axis A. The first gear 323A engaged with the first adjustment gear 332 may move in the first direction (e.g., the +X direction). The first base 321A and the first lens 324A may move in the first direction (e.g., the +X direction). The second base 321B and the second lens 324B may not substantially move.

Although not shown in FIGS. 10 to 12, if the lever 331 rotates in a rotation direction (e.g., the second rotation direction R2 of FIGS. 6 to 9) opposite to the first rotation direction R1 about the rotation axis A, the first adjustment gear 332 may rotate in the rotation direction about the rotation axis A. The first gear 323A, the first base 321A, and the first lens 324A may move in the second direction (e.g., the −X direction) opposite to the first direction (e.g., the +X direction). The second gear 323B, the second base 321B, and the second lens 324B may not substantially move.

Figure 13:
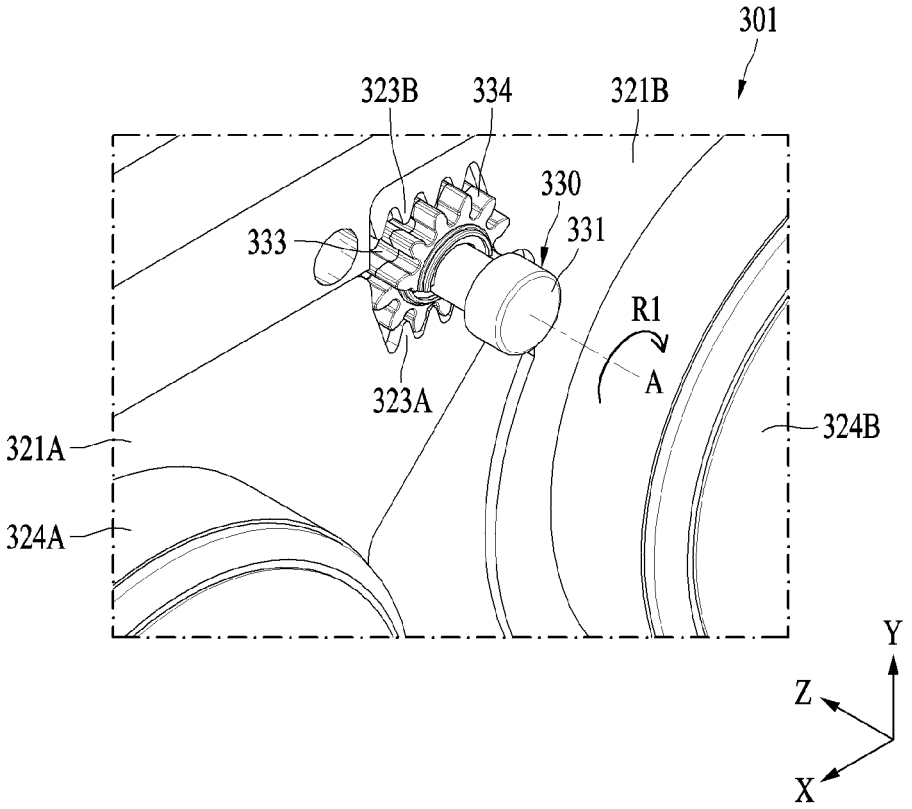
FIG. 13 is an enlarged view of a wearable electronic device when a lever is in a second position according to an embodiment.
Figure 14:
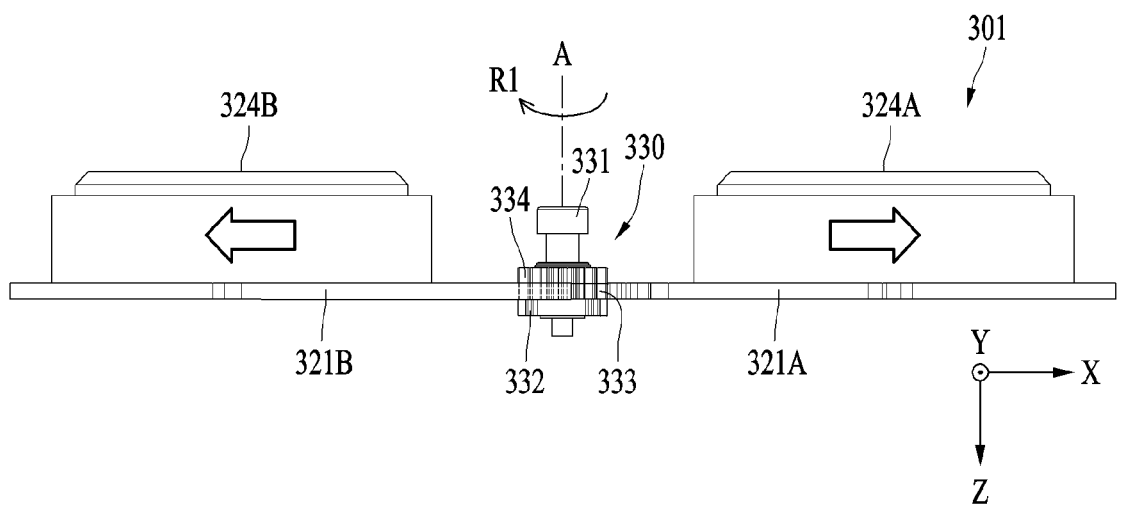
FIG. 14 is a bottom view of the wearable electronic device when the lever is in the second position according to an embodiment.
Figure 15:
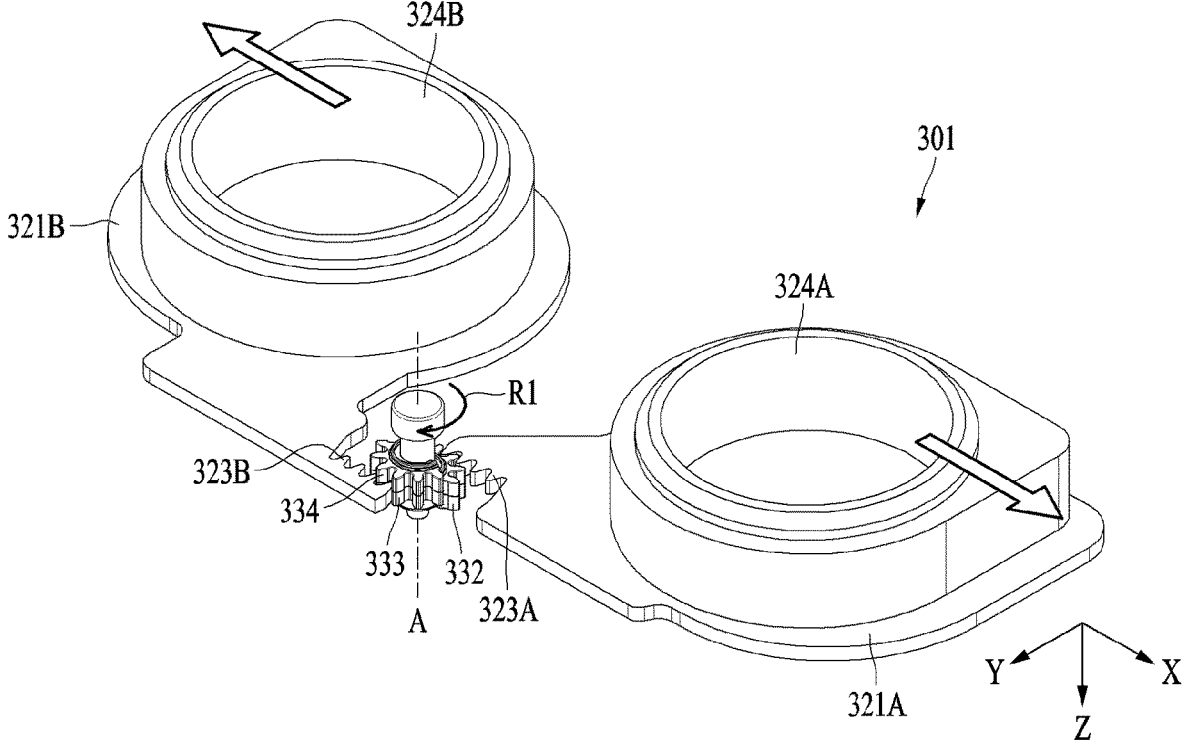
FIG. 15 is a perspective view of the wearable electronic device when the lever is in the second position according to an embodiment.

FIG. 13 is an enlarged view of a wearable electronic device when a lever is in a second position according to an embodiment. FIG. 14 is a bottom view of the wearable electronic device when the lever is in the second position according to an embodiment. FIG. 15 is a perspective view of the wearable electronic device when the lever is in the second position according to an embodiment.

Referring to FIGS. 13 to 15, the wearable electronic device 301 may include the first base 321A, the second base 321B, the first gear 323A, the second gear 323B, the first lens 324A, the second lens 324B, and the adjustment structure 330. The adjustment structure 330 may include the lever 331 having the rotation axis A, the first adjustment gear 332, the second adjustment gear 333, and the third adjustment gear 334.

When the lever 331 is in the second position along the rotation axis A, the second adjustment gear 333 may be engaged with the first gear 323A and the second gear 323B. The user may place the lever 331 in the second position by applying pressure with their hand as needed along the direction of the rotation axis A. After configuring the lever in the desired position along the rotation axis A, the user may rotate the lever 331 about the axis A in order to adjust the distance between the lenses to suit the distance between the eyes of the user. The first adjustment gear 332 and the third adjustment gear 334 may not be engaged with any one of the first gear 323A and the second gear 323B.

When the lever 331 rotates in the first rotation direction R1 (e.g., a counterclockwise direction around the +Z axis) about the rotation axis A, the second adjustment gear 333 may rotate in the first rotation direction R1 about the rotation axis A. The first gear 323A engaged with the second adjustment gear 333 may move in the first direction (e.g., the +X direction). The first base 321A and the first lens 324A may move in the first direction (e.g., the +X direction). The second gear 323B engaged with the second adjustment gear 333 may move in the second direction (e.g., the −X direction) opposite to the first direction. The second base 321B and the second lens 324B may move in the second direction (e.g., the −X direction).

Although not shown in FIGS. 13 to 15, if the lever 331 rotates in a rotation direction (e.g., the second rotation direction R2 of FIGS. 6 to 9) opposite to the first rotation direction R1 about the rotation axis A, the second adjustment gear 333 may rotate in the rotation direction about the rotation axis A. The first gear 323A, the first base 321A, and the first lens 324A may move in the second direction (e.g., the −X direction). The second gear 323B, the second base 321B, and the second lens 324B may move in the first direction (e.g., the +X direction).

Figure 16:
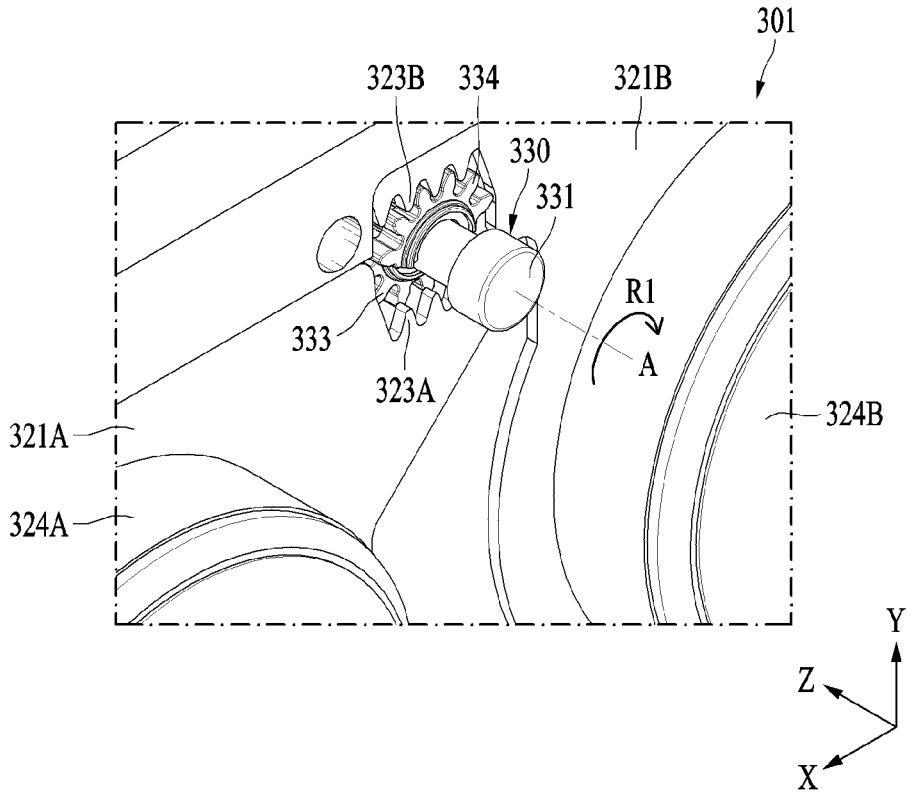
FIG. 16 is an enlarged view of a wearable electronic device when a lever is in a third position according to an embodiment.
Figure 17:
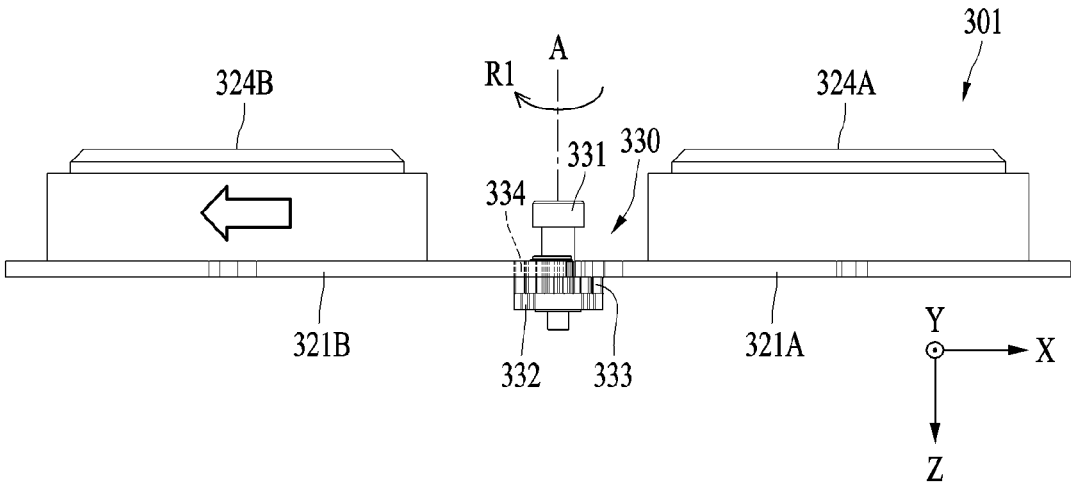
FIG. 17 is a bottom view of the wearable electronic device when the lever is in the third position according to an embodiment.
Figure 18:
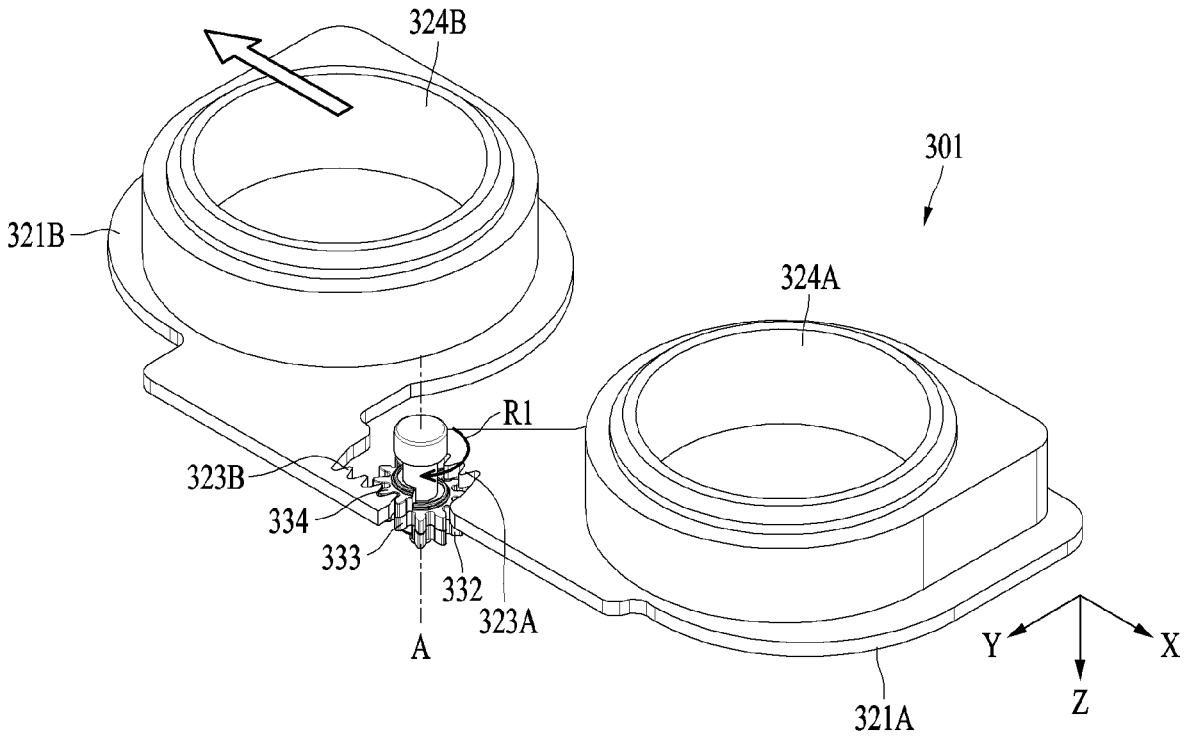
FIG. 18 is a perspective view of the wearable electronic device when the lever is in the third position according to an embodiment.

FIG. 16 is an enlarged view of a wearable electronic device when a lever is in a third position according to an embodiment. FIG. 17 is a bottom view of the wearable electronic device when the lever is in the third position according to an embodiment. FIG. 18 is a perspective view of the wearable electronic device when the lever is in the third position according to an embodiment.

Referring to FIGS. 16 to 18, the wearable electronic device 301 may include the first base 321A, the second base 321B, the first gear 323A, the second gear 323B, the first lens 324A, the second lens 324B, and the adjustment structure 330. The adjustment structure 330 may include the lever 331 having the rotation axis A, the first adjustment gear 332, the second adjustment gear 333, and the third adjustment gear 334.

When the lever 331 is in the third position along the rotation axis A, the third adjustment gear 334 may be engaged with the second gear 323B. The user may place the lever 331 in the third position by applying pressure with their hand as needed along the direction of the rotation axis A. The first adjustment gear 332 and the second adjustment gear 333 may not be engaged with any one of the first gear 323A and the second gear 323B.

When the lever 331 rotates in the first rotation direction R1 (e.g., a counterclockwise direction around the +Z axis) about the rotation axis A, the third adjustment gear 334 may rotate in the first rotation direction R1 about the rotation axis A. The second gear 323B engaged with the third adjustment gear 334 may move in the second direction (e.g., the −X direction). The second base 321B and the second lens 324B may move in the second direction (e.g., the −X direction). The first base 321A and the first lens 324A may not substantially move.

Although not shown in FIGS. 16 to 18, if the lever 331 rotates in a rotation direction (e.g., the second rotation direction R2 of FIGS. 6 to 9) opposite to the first rotation direction R1 about the rotation axis A, the third adjustment gear 334 may rotate in the rotation direction about the rotation axis A. The second gear 323B, the second base 321B, and the second lens 324B may move in the first direction (e.g., the +X direction). The first gear 323A, the first base 321A, and the first lens 324A may not substantially move.

Figure 19:
FIG. 19 is a plan view of a wearable electronic device in a state in which a position of a first lens and a position of a second lens are the same according to an embodiment.
Figure 20:
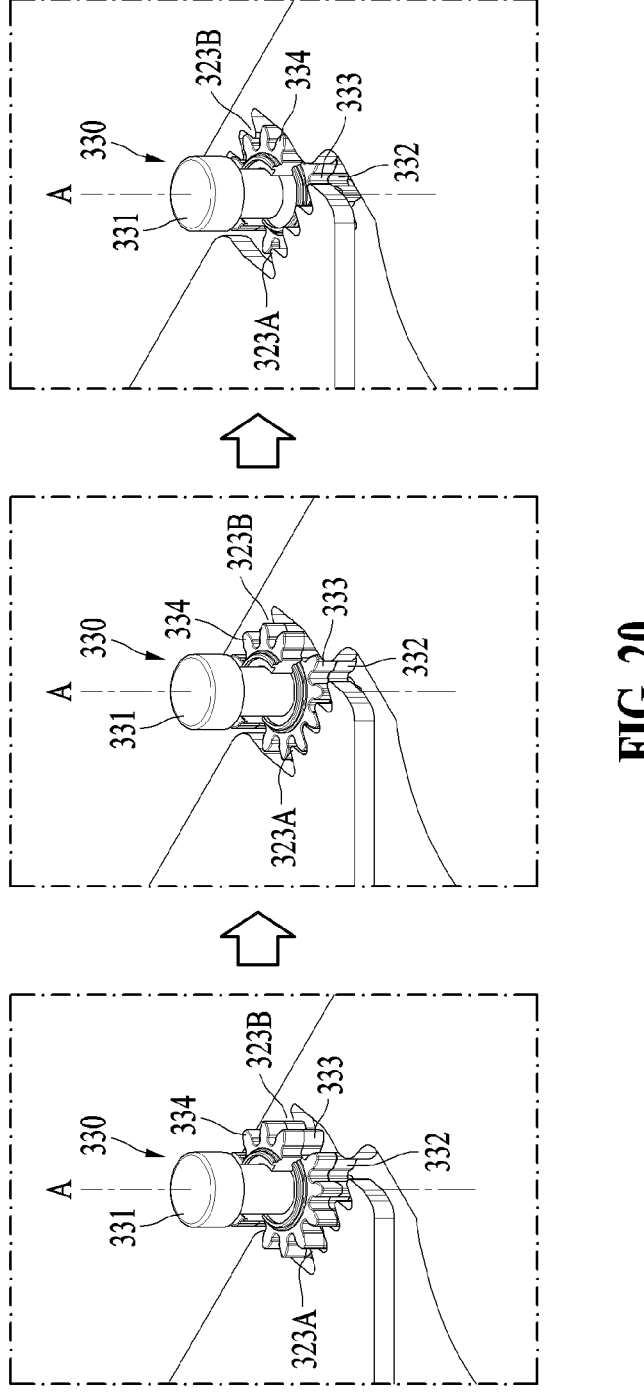
FIG. 20 is a diagram illustrating an operation of an adjustment structure in the state in which the position of the first lens and the position of the second lens are the same according to an embodiment.

FIG. 19 is a plan view of a wearable electronic device in a state in which a position of a first lens and a position of a second lens are the same according to an embodiment. FIG. 20 is a diagram illustrating an operation of an adjustment structure in the state in which the position of the first lens and the position of the second lens are the same according to an embodiment.

Referring to FIGS. 19 and 20, the wearable electronic device 301 may include the support body 315. The support body 315 may include the body portion 316. The body portion 316 may include the first edge 3161A, the second edge 3162A, the first side edge 3163A, the third edge 3161B, the fourth edge 3162B, and the second side edge 3163B. The wearable electronic device 301 may include the first lens structure 320A, and the second lens structure 320B. The first lens structure 320A may include the first base 321A, the first gear 323A, and the first lens 324A. The second lens structure 320B may include the second base 321B, the second gear 323B, and the second lens 324B. The wearable electronic device 301 may include the adjustment structure 330. The adjustment structure 330 may include the lever 331 having the rotation axis A, the first adjustment gear 332, the second adjustment gear 333, and the third adjustment gear 334.

In an embodiment, a first gap G1 may be defined as a distance between an outer edge (e.g., an edge facing the +X direction) of the first base 321A and the first side edge 3163A. The first gap G1 may be defined as a range of movement of the first base 321A and/or the first lens 324A in the first direction (e.g., the +X direction) or the second direction (e.g., the –X direction). For example, the first gap G1 may be in a range of about 0 millimeters (mm) to about 3 mm.

In an embodiment, a second gap G2 may be defined as a distance between an outer edge (e.g., an edge facing the –X direction) of the second base 321B and the second side edge 3163B. The second gap G2 may be defined as a range of movement of the second base 321B and/or the second lens 324B in the first direction (e.g., the +X direction) or the second direction (e.g., the –X direction). For example, the second gap G2 may be in a range of about 0 mm to about 3 mm.

In an embodiment, when the position of the first lens 324A is substantially the same as the position of the second lens 324B, the size of the first gap G1 may be substantially equal to the size of the second gap G2. The lever 331 may move in the direction (e.g., the +/–Z direction) along the rotation axis A. The first adjustment gear 332, the second adjustment gear 333, and the third adjustment gear 334 may be configured not to contact the first gear 323A and the second gear 323B in the direction (e.g., the +/–Z direction) along the rotation axis A.

Figure 21:
FIG. 21 is a plan view of a wearable electronic device in a state in which a position of a first lens and a position of a second lens are different from each other according to an embodiment.
Figure 22:
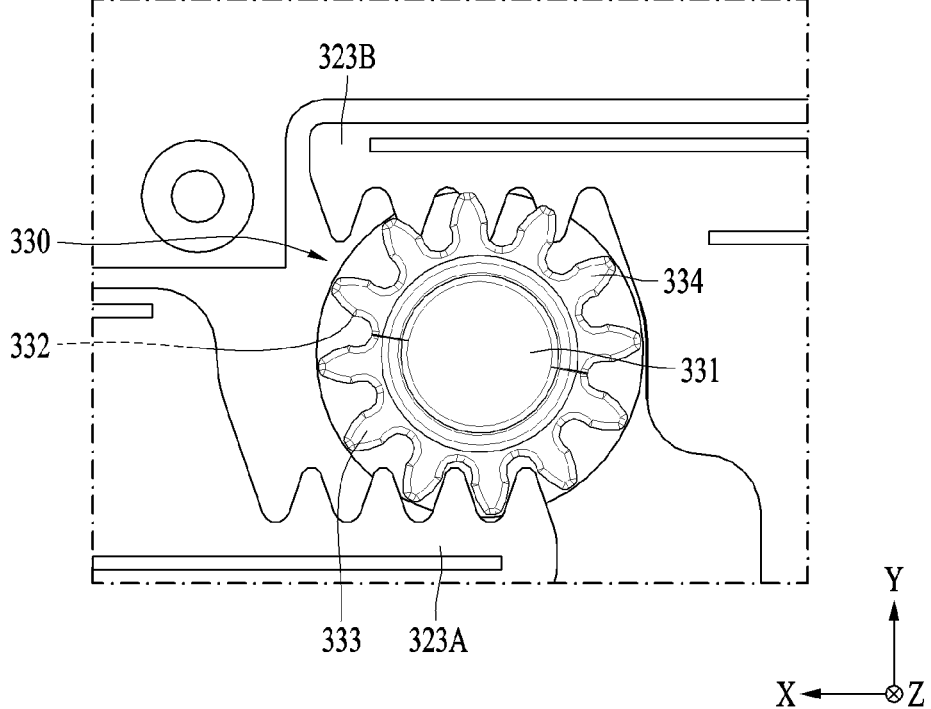
FIG. 22 is an enlarged view of an adjustment structure in the state in which the position of the first lens and the position of the second lens are different from each other according to an embodiment.

FIG. 21 is a plan view of a wearable electronic device in a state in which a position of a first lens and a position of a second lens are different from each other according to an embodiment. FIG. 22 is an enlarged view of an adjustment structure in the state in which the position of the first lens and the position of the second lens are different from each other according to an embodiment.

Referring to FIGS. 21 and 22, the wearable electronic device 301 may include the support body 315. The support body 315 may include the body portion 316. The body portion 316 may include the first edge 3161A, the second edge 3162A, the first side edge 3163A, the third edge 3161B, the fourth edge 3162B, and the second side edge 3163B. The wearable electronic device 301 may include the first lens structure 320A, and the second lens structure 320B. The first lens structure 320A may include the first base 321A, the first gear 323A, and the first lens 324A. The second lens structure 320B may include the second base 321B, the second gear 323B, and the second lens 324B. The wearable electronic device 301 may include the adjustment structure 330. The adjustment structure 330 may include the lever 331 having the rotation axis A, the first adjustment gear 332, the second adjustment gear 333, and the third adjustment gear 334.

In an embodiment, when the position of the first lens 324A is different from the position of the second lens 324B, the size of the first gap G1 may be different from the size of the second gap G2. Movement of the lever 331 in the direction (e.g., the +/–Z direction) along the rotation axis A may be reduced or substantially prevented. At least one (e.g., the first adjustment gear 332) of the plurality of adjustment gears 332, 333, and 334 may be configured to contact a gear (e.g., the second gear 323B) disposed on a base (e.g., the second base 321B).

In an embodiment, when the position of the first lens 324A is different from the position of the second lens 324B, the movement of the lever 331 in the direction (e.g., the +/–Z direction) along the rotation axis A may be partially permitted. At least one adjustment gear (e.g., the first adjustment gear 332 and/or the second adjustment gear 333) among the plurality of adjustment gears 332, 333, and 334 may be configured to be engaged with a gear (e.g., the first gear 323A) disposed on a base (e.g., the first base 321A). The at least one adjustment gear may be engaged with the gear disposed on the base to prevent the lever 331 from substantially rotating about the rotation axis A.

In an embodiment, when the position of the first lens 324A is different from the position of the second lens 324B, the adjustment structure 330 may be in a locked state in which adjustment of the position of the first lens 324A and/or the position of the second lens 324B is restricted. For example, when the first lens 324A is to move in the +X direction in a state in which the size of the first gap G1 is substantially 0 mm and the size of the second gap G2 is about 3 mm, movement of the first lens 324A may be restricted by the first side edge 3163A of the body portion 316. The locking of the adjustment structure 330 when the position of the first lens 324A and the position of the second lens 324B are different from each other may allow a user to recognize an incorrect operation, thereby inducing an action of the user to adjust the position of the first lens 324A and the position of the second lens 324B to be substantially the same.

One aspect of the present disclosure may provide a wearable electronic device configured to adjust a distance between lenses.

According to an embodiment, a wearable electronic device 201, 301 may include a first base 321A configured to move in a first direction or in a second direction opposite to the first direction. The wearable electronic device 201, 301 may include a first lens 324A disposed on the first base 321A. The wearable electronic device 201, 301 may include a first gear 323A connected to the first base 321A. The wearable electronic device 201, 301 may include a second base 321B configured to move in the first direction or the second direction. The wearable electronic device 201, 301 may include a second lens 324B disposed on the second base 321B. The wearable electronic device 201, 301 may include a second gear 323B connected to the second base 321B. The wearable electronic device 201, 301 may include a support body 315 configured to support the first base 321A and the second base 321B. The wearable electronic device 201, 301 may include an adjustment structure 330 configured to adjust a distance between the first lens 324A and the second lens 324B. The adjustment structure 330 may include a lever 331 having a rotation axis A in a third direction different from the first direction and the second direction. The lever 331 may be configured to move along the rotation axis A. The lever 331 may be configured to rotate about the rotation axis A. The adjustment structure 330 may include a first adjustment gear 332 configured to be engaged with the first gear 323A in a first position of the lever 331 along the rotation axis A. The adjustment structure 330 may include a second adjustment gear 333 configured to be engaged with the first gear 323A and the second gear 323B in a second position of the lever 331 along the rotation axis A. The adjustment structure 330 may include a third adjustment gear 334 configured to be engaged with the second gear 323B in a third position of the lever 331 along the rotation axis A.

In an embodiment, the first adjustment gear 332 may not overlap the third adjustment gear 334 when viewed along the rotation axis A.

In an embodiment, the second adjustment gear 333 may overlap the first adjustment gear 332 and the third adjustment gear 334 when viewed along the rotation axis A.

In an embodiment, the second adjustment gear 333 may be disposed between the first adjustment gear 332 and the third adjustment gear 334.

In an embodiment, the first adjustment gear 332, the second adjustment gear 333, and the third adjustment gear 334 may be integrally and seamlessly connected to each other. In some embodiments, the first adjustment gear abuts the second adjustment gear, and the second adjustment gear abuts the third adjustment gear (see FIG. 7).

In an embodiment, the first adjustment gear 332, the second adjustment gear 333, or the third adjustment gear 334 may be integrally and seamlessly connected to the lever 331. In some embodiments, the first adjustment gear, the second adjustment gear, the third adjustment gear and the lever are integrally formed.

In an embodiment, the support body 315 may include a first side edge 3163A having a first distance G1 from the first base 321A, and a second side edge 3163B having a second distance G2 from the second base 321B. The lever 331 may be configured to move along the rotation axis A when the first distance G1 is substantially equal to the second distance G2.

In an embodiment, the adjustment structure 330 may be configured to reduce or prevent a movement of the lever 331 along the rotation axis A when the first distance G1 is different from the second distance G2.

In an embodiment, the first adjustment gear 332, the second adjustment gear 333, or the third adjustment gear 334 may be configured to be locked to the first gear 323A or the second gear 323B when the first distance G1 is different from the second distance G2.

In an embodiment, the lever 331 may include a shaft 331A having the rotation axis A. The shaft 331A may be connected to the first adjustment gear 332, the second adjustment gear 333, and the third adjustment gear 334. The lever 331 may include a handle 331B connected to the shaft 331A.

In an embodiment, the lever 331 may be disposed between the first base 321A and the second base 321B.

In an embodiment, the first base 321A and the second base 321B may be disposed on substantially the same plane.

In an embodiment, the wearable electronic device 301 may include a first arm 322A that extends or expands toward the inside of the first base 321A. The first gear 323A may be formed at an edge of the first arm 322A in the first direction or the second direction.

In an embodiment, the first arm 322A may be disposed on a first side of each of the first adjustment gear 332, the second adjustment gear 333, and the third adjustment gear 334.

In an embodiment, the wearable electronic device 301 may include a second arm 322B that extends or expands toward the inside of the second base 321B. The second gear 323B may be formed at an edge of the second arm 322B in the first direction or the second direction.

In an embodiment, the second arm 322B may be disposed on a second side opposite to a first side of each of the first adjustment gear 332, the second adjustment gear 333, and the third adjustment gear 334.

In an embodiment, the support body 315 may be configured to guide a movement of the first base 321A and a movement of the second base 321B.

In an embodiment, the support body 315 may include an opening 318 configured to at least partially receive at least one of the lever 331, the first adjustment gear 332, the second adjustment gear 333, or the third adjustment gear 334, or any combination thereof.

In an embodiment, the first base 321A and the second base 321B may be separated from each other.

In an embodiment, the first direction and the second direction may be substantially orthogonal to the third direction.

According to an embodiment, a position of a lens corresponding to a left eye of a user and a position of a lens corresponding to a right eye of the user may be simultaneously or individually adjusted.

The effects of a wearable electronic device according to embodiments are not limited to the above-mentioned effects, and other unmentioned effects can be clearly understood from the above description by one of ordinary skill in the art.

The embodiments of the present disclosure are intended to be illustrative and not restrictive. Various modifications may be made to the detailed description of the present disclosure including the accompanying scope of claims and equivalents. Any of the embodiment(s) described herein may be used in combination with any other embodiment(s) described herein.

What is claimed is:

1. A wearable electronic device comprising:
   a first base configured to move in a first direction or a second direction opposite to the first direction;
   a first lens disposed on the first base;
   a first gear connected to the first base;
   a second base configured to move in the first direction or the second direction;
   a second lens disposed on the second base;
   a second gear connected to the second base;
   a support body configured to support the first base and the second base; and
   an adjustment structure configured to adjust a distance between the first lens and the second lens,
   wherein the adjustment structure comprises:
      a lever having a rotation axis in a third direction different from the first direction and the second direction, the lever being configured to move along the rotation axis and configured to rotate about the rotation axis,
      a first adjustment gear configured to be engaged with the first gear in a first position of the lever along the rotation axis;
      a second adjustment gear configured to be engaged with the first gear and the second gear in a second position of the lever along the rotation axis, and
      a third adjustment gear configured to be engaged with the second gear in a third position of the lever along the rotation axis.

2. The wearable electronic device of claim 1, wherein the first adjustment gear does not overlap the third adjustment gear when viewed along the rotation axis.

3. The wearable electronic device of claim 2, wherein the second adjustment gear overlaps the first adjustment gear and the third adjustment gear when viewed along the rotation axis.

4. The wearable electronic device of claim 1, wherein the second adjustment gear is disposed between the first adjustment gear and the third adjustment gear.

5. The wearable electronic device of claim 4, wherein the first adjustment gear abuts the second adjustment gear, and the second adjustment gear abuts the third adjustment gear.

6. The wearable electronic device of claim 5, wherein the first adjustment gear, the second adjustment gear, the third adjustment gear and the lever are integrally formed.

7. The wearable electronic device of claim 1, wherein the support body comprises:

a first side edge having a first distance from the first base; and a second side edge having a second distance from the second base, and wherein the lever is configured to move along the rotation axis when the first distance is substantially equal to the second distance.

8. The wearable electronic device of claim 1, wherein the support body comprises:

a first side edge having a first distance from the first base; and a second side edge having a second distance from the second base, and wherein the adjustment structure is configured to reduce or prevent a movement of the lever along the rotation axis when the first distance is different from the second distance.

9. The wearable electronic device of claim 1, wherein the support body comprises:

a first side edge having a first distance from the first base; and a second side edge having a second distance from the second base, and wherein the first adjustment gear, the second adjustment gear, or the third adjustment gear is configured to be locked to the first gear or the second gear when the first distance is different from the second distance.

10. The wearable electronic device of claim 1, wherein the lever comprises:

a shaft having the rotation axis, the shaft being connected to the first adjustment gear, the second adjustment gear, and the third adjustment gear; and a handle connected to the shaft.

11. The wearable electronic device of claim 1, wherein the lever is disposed between the first base and the second base.

12. The wearable electronic device of claim 1, wherein the first base and the second base are disposed on substantially a same plane.

13. The wearable electronic device of claim 1, further comprising a first arm that extends or expands toward an inside of the first base, wherein the first gear is formed at a first edge of the first arm in the first direction or the second direction.

14. The wearable electronic device of claim 13, wherein the first arm is disposed on a first side of each of the first adjustment gear, the second adjustment gear, and the third adjustment gear.

15. The wearable electronic device of claim 14, further comprising a second arm that extends or expands toward an inside of the second base, wherein the second gear is formed at a second edge of the second arm in the first direction or the second direction.

16. The wearable electronic device of claim 15, wherein the second arm is disposed on a second side opposite to a first side of each of the first adjustment gear, the second adjustment gear, and the third adjustment gear.

17. The wearable electronic device of claim 1, wherein in the first position of the lever along the rotation axis, the first gear only engages with the first adjustment gear among the first adjustment gear, the second adjustment gear, and the third adjustment gear, and wherein in the third position of the lever along the rotation axis, the second gear only engages with the third adjustment gear among the first adjustment gear, the second adjustment gear, and the third adjustment gear.

18. The wearable electronic device of claim 1, wherein the second adjustment gear overlaps with the first adjustment gear and the third adjustment gear when viewed along the rotation axis.

19. The wearable electronic device of claim 1, wherein the first adjustment gear, the second adjustment gear, and the third adjustment gear are arranged with respect to each other along the rotation axis.

20. The wearable electronic device of claim 1, wherein the the first adjustment gear, the second adjustment gear, and the third adjustment gear are configured to rotate about the rotation axis.

* * * * *